US007871822B2

(12) United States Patent
Wagner et al.

(10) Patent No.: US 7,871,822 B2
(45) Date of Patent: Jan. 18, 2011

(54) METHOD OF USE FOR CHARACTERIZING THE CATALYTIC REACTIVITY OF CATALYST(S)

(75) Inventors: Alain Wagner, Strasbourg (FR); Cédric Catala, Mundolsheim (FR)

(73) Assignee: Novalyst Discovery, Strasbourg (FR)

( * ) Notice: Subject to any disclaimer, the term of this patent is extended or adjusted under 35 U.S.C. 154(b) by 964 days.

(21) Appl. No.: 10/587,177

(22) PCT Filed: Jan. 28, 2005

(86) PCT No.: PCT/FR2005/050056

§ 371 (c)(1),
(2), (4) Date: Nov. 24, 2006

(87) PCT Pub. No.: WO2005/078431

PCT Pub. Date: Aug. 25, 2005

(65) Prior Publication Data
US 2007/0161038 A1 Jul. 12, 2007

(30) Foreign Application Priority Data

Jan. 30, 2004 (FR) .................................. 04 50175

(51) Int. Cl.
*G01N 31/10* (2006.01)
(52) U.S. Cl. .............................. 436/37; 436/85; 436/86; 436/139; 436/140; 436/141; 436/142; 436/173; 702/22; 702/23; 702/24; 702/25
(58) Field of Classification Search .................. 436/37, 436/85–86, 139–142, 173; 702/22–25
See application file for complete search history.

(56) References Cited

U.S. PATENT DOCUMENTS 5,247,110 A * 9/1993 Bank .......................... 556/415
5,567,596 A * 10/1996 Diamond et al. .............. 435/13

(Continued)

FOREIGN PATENT DOCUMENTS

GB          2327754        *   2/1999

(Continued)

OTHER PUBLICATIONS

Burtle, J. G. et al, Analytical Chemistry 1955, 27, 1215-1217.*

(Continued)

*Primary Examiner*—Arlen Soderquist
(74) *Attorney, Agent, or Firm*—Oliff & Berridge, PLC (57) ABSTRACT A method for selecting at least one catalyst from a catalyst library on the basis of the reactivity thereof in a chemical conversion process includes: (a) testing the catalytic activity of a first catalyst from said catalyst library with respect to a reaction medium containing, as the compounds to be converted, at least one reactivity probe having a labeling system and including at least one reaction unit capable of reacting in said chemical conversion; (b) analyzing the reaction medium after said catalytic test for the purpose of qualitatively and/or qualitatively characterizing the resulting compounds; (c) repeating steps (a) and (b) for at least one other catalyst in said library; and (d) comparing the analysis results for each catalyst in order to characterize at least one catalyst having the required reactivity in said chemical conversion.

17 Claims, 9 Drawing Sheets

U.S. PATENT DOCUMENTS

| | | | | |
|---|---|---|---|---|
| 5,576,216 | A * | 11/1996 | Patchornik | 436/86 |
| 6,063,633 | A * | 5/2000 | Willson, III | 436/37 |
| 6,312,896 | B1 * | 11/2001 | Heroux et al. | 435/6 |
| 6,316,616 | B1 * | 11/2001 | Jacobsen et al. | 540/484 |
| 6,602,714 | B1 * | 8/2003 | Tagge et al. | 506/37 |
| 6,627,445 | B1 * | 9/2003 | Akporiaye et al. | 436/37 |
| 2002/0045190 | A1 * | 4/2002 | Wilson et al. | 435/7.1 |
| 2002/0141900 | A1 * | 10/2002 | Guan et al. | 422/68.1 |
| 2002/0182735 | A1 * | 12/2002 | Kibby et al. | 436/37 |
| 2003/0143648 | A1 * | 7/2003 | Cravatt et al. | 435/7.23 |
| 2003/0211536 | A1 * | 11/2003 | Geysen | 435/7.1 |
| 2004/0077096 | A1 * | 4/2004 | Nayar et al. | 436/57 |
| 2005/0106655 | A1 * | 5/2005 | Savage et al. | 435/23 |
| 2007/0161039 | A1 * | 7/2007 | Wagner et al. | 435/7.1 |
| 2007/0243556 | A1 * | 10/2007 | Wachs | 435/7.1 |

FOREIGN PATENT DOCUMENTS

| | | | |
|---|---|---|---|
| WO | 01/00869 | * | 1/2001 |

OTHER PUBLICATIONS

Ekstrom, A. et al, Journal of Physical Chemistry, 1989, 93, 5230-5237.*
Quirke, J. M. E. et al, Analytical Chemistry 1994, 66, 1302-1315.*
Cavanaugh, M. D. et al, Organometallics 1996, 15, 2764-2769.*
Lesley, G. et al, Organometallics 1996, 15, 5137-5154.*
Cao, P. et al, Journal of Chromatography A 1997, 759, 111-117.*
Chen, Y.-X. (E.) et al, Journal of the American Chemical Society 1998, 120, 6287-6305.*
McGuinness, D. S. et al, Journal of Organometallic Chemistry 1998, 565, 165-178.*
Stevenson, D. E. et al, Enzyme and Microbial Technology 1999, 25, 357-363.*
Lin, S. et al, Macromolecules 1999, 32, 8283-8290.*
Jia, C. et al, Journal of the American Chemical Society 2000, 122, 7252-7263.*
Novak, T. J. et al, Journal of Pharmaceutical and Biomedical Analysis 2000, 23, 705-713.*
Mikkelsen, O. et al, Microporous and Mesoporous Materials 2000, 40, 95-113.*
Torisawa, Y. et al, Organic Process Research & Development 2001, 5, 84-88.*
Voskoboynikov, A. Z. et al, Organometallics 2001, 20, 2794-2801.*
Choo, H. et al, Journal of Physical Chemistry B 001, 105, 7730-7738.*
Miller, K. J. et al, Organometallics 2001, 20, 4403-4412.*
Higashi, T. et al, Journal of Chromatography B 2002, 772, 229-238.*
Roy, A. K. et al, Journal of the American Chemical Society 2002, 124, 9510-9524.*
Britovsek, G. J. P. et al, Inorganica Chimica Acta 2003, 345, 279-291.*
Ma, S., Accounts of Chemical Research 2003, 36, 701-712.*
Na, Y, et al, Journal of the American Chemical Society 2004, 126, 250-258.*
Patricia Y. Kuo et al.; "A planning module for performing grid search, factorial design, and related combinatorial studies on an automated chemistry workstation;" *Chemometrics and Intelligent Laboratory Systems*; vol. 48, No. 2; 1999; pp. 219-234.
Berthold Hinzen; "5 Encoding Strategies for Combinatorial Libraries;" *Combinatorial Chemistry A Practical Approach* XP-002333109; pp. 239-242.

* cited by examiner

METHOD OF USE FOR CHARACTERIZING THE CATALYTIC REACTIVITY OF CATALYST(S)

The present invention relates to the field of catalysis and is targeted in particular at providing a method for identifying one or more novel catalytic applications of a catalyst and/or selecting at least one catalyst from a library of catalysts for its reactivity with regard to a chemical conversion.

Organic synthesis by the catalytic route, in particular by heterogeneous catalysis, is a synthetic route which is particularly valued industrially. This is because the use of a catalyst makes it possible generally to accelerate the reaction rate, to lower the reaction temperature and/or to increase the yield thereof. Furthermore, heterogeneous catalysts, that is to say catalysts insoluble in the reaction medium, in contrast to "homogeneous" catalysts, have the significant advantage of being easily separated from the reaction products on conclusion of the chemical reaction under consideration.

For all these reasons, organic synthesis by the catalytic route thus represents an advantageous alternative to standard organic synthesis.

Unfortunately, the development of this method of synthesis remains limited today, mainly because of insufficient knowledge of the potential catalytic activities of the catalysts currently available.

It is precisely the object of the present invention to provide a method which makes it possible to rapidly access such information.

More specifically, the present invention relates, according to one of its aspects, to a method for selecting at least one catalyst, in particular from a library of catalysts, for its reactivity with regard to a chemical conversion, characterized in that it comprises at least the stages consisting in:

a) testing the catalytic activity of a first catalyst belonging to said library of catalysts with regard to a reaction medium comprising, as compound to be converted, at least one reactivity probe having a labeling system and comprising at least one reaction unit capable of reacting according to said chemical conversion, b) analyzing, on conclusion of said catalytic test, said reaction medium so as to qualitatively and/or quantitatively characterize the compounds formed, c) repeating stages a) and b) for at least one other catalyst of said library, and d) comparing the analytical results obtained for each catalyst so as to characterize at least one catalyst having the required reactivity with regard to said chemical conversion.

Within the meaning of the present invention, the term "reactivity" encompasses the notions of activity and of lack of activity. For example, the reactivity of a catalyst can be reflected by an increase in the yield of the chemical conversion under consideration but also by the display of a lack of activity which can, for its part, be advantageous with regard to the selectivity for a catalytic reaction.

According to an alternative form of the invention, the reaction medium comprises a single reactivity probe.

According to another alternative form of the invention, the labeled reactivity probe is used in combination with at least one other reactivity probe having or not having a labeling system.

According to another alternative form of the invention, the reaction medium comprises at least two types of reactivity probe, each type of probe having a labeling system and comprising at least one reaction unit capable of reacting with at least one unit present on the other type of probe according to a chemical conversion.

Each probe can have a labeling system which is specific to it, in which case any reaction occurring between at least two probes will have the effect of resulting in the formation of a compound incorporating their respective labels.

According to another of its aspects, the invention relates to a method for characterizing at least one catalytic application of a catalyst, characterized in that it comprises at least the stages consisting in:

a) testing the catalytic activity of a first catalyst with regard to a reaction medium comprising, as compounds to be converted, a series of reactivity probes, each probe being different from one another and comprising at least one reaction unit capable of reacting with at least one other unit present on a separate or nonseparate probe, b) analyzing, on conclusion of said catalytic test, said reaction medium so as to qualitatively and/or quantitatively characterize the compounds formed, c) repeating stages a) and b) for at least one other catalyst, d) comparing the analytical results obtained for each catalyst so as to distinguish, if appropriate, from the data common to a large number of reaction media, the data more particularly specific to each analysis carried out according to stage b), e) characterizing the compound or compounds corresponding to these specific data, and f) qualifying and/or quantifying the catalytic reactivity of the corresponding catalyst or catalysts.

The reactions capable of occurring in the method according to the invention encompass heterocoupling reactions, that is to say resulting from the reaction of a reaction unit present on a first probe with a reaction unit present on a second probe, and homocoupling reactions resulting from the reaction of the two reaction units carried by two identical probes or even the same probe.

Likewise, the reactions considered according to the invention may involve the presence of coreactants, such as, for example, carbon monoxide, capable of initiating, indeed even of participating in, the desired couplings.

In a favored alternative form of the invention, the reactivity probes, combined in the series considered for the catalytic test, are each associated with a labeling system. The probes can be discriminated through the nature of their respective label or by the weight of their specific probe-label combination. Whatever the option considered, stage b), which is targeted at analyzing the reaction medium which has been subjected to the catalytic test, comprises the detection of the group of the probe-labeling system combinations obtained on conclusion of stage a) and stage d) comprises the characterization of the common data by the detection of these combinations.

According to a specific embodiment, the method according to the invention is at least partially carried out via a computer system.

In particular, the library of catalysts as well as the analytical data required for each catalyst with regard to a given reactivity probe or series of reactivity probes can be recorded on a data medium and/or the data can be compared in stage d) via a computer tool.

Thus, the present invention also relates, according to another of its aspects, to a computer system of use in the implementation of a method according to the invention, characterized in that it comprises at least one computer server arranged for:

a) archiving, for each catalyst tested according to a method of the invention, the group of the data acquired during the analysis of the corresponding reaction medium,
b) comparing the data archived for the group of the catalysts tested for the purpose of characterizing specific catalytic reactivities, and
c) archiving the specific reactivities detected according to stage b).

The various subject matters of the invention will be defined more particularly below.

Within the meaning of the present invention:

The term "catalytic activity" is intended to denote the ability of a catalyst to become involved in a chemical or biological reaction. Generally, a catalyst is regarded as active within the meaning of the present invention when it makes it possible to obtain one or more new compounds, to significantly increase the yield for the formation of a new compound or a compound already known, and/or to bring about a novel selectivity. As specified above, this catalytic activity can also be reflected by a lack of activity for the chemical conversion of a reaction unit and may be advantageous precisely on this account.

The term "conversion" is intended to denote a reaction localized on a reaction unit. This term encompasses any type of reaction, namely conversion, coupling or dissociation, insofar as it is localized on a reaction unit. Mention may in particular be made, by way of illustration and without applied limitation of conversions capable of being carried out according to the invention, of the following conversions: formation of C—C; C=C; C≡C; C=N; C—N; C—O; C—X; C=O bonds; cycloaddition, and/or insertion and/or rearrangement reaction.

The term "compound" is intended to denote any entity, namely compound or reactivity probe, having at least one reaction unit capable of being chemically or biologically converted in the presence of a catalyst.

The term "reaction unit" is intended to denote a unit representing at least one bond or functional group capable of being chemically or biologically converted. This unit can in particular be composed of a saturated bond of a carbon atom with at least one halogen atom and/or one heteroatom, or an unsaturated bond between two carbon atoms, between a carbon atom and at least one heteroatom or between two identical or different heteroatoms. More specifically, the unsaturated bonds between two carbon atoms can be $C_{sp}$ hydrocarbon bonds of alkyne type or $C_{sp}^2$ hydrocarbon bonds of alkene type. Within the meaning of the present invention, the term "heteroatom" is intended to cover a nitrogen, oxygen, sulfur, phosphorus or silicon atom.

Mention may in particular be made, by way of representation and without implied limitation of reaction units, of the following units:

with X representing a halogen atom.

Reactivity Probes

They generally represent models of chemical compounds. In order to do this, they have, in their structure, at least one reaction unit capable of being converted according to a catalytic chemical or biological reaction which can in particular be chosen from those mentioned above.

When the method according to the invention is targeted more particularly at characterizing the effectiveness of one or more catalysts for a given conversion, the reactivity probes more particularly selected advantageously have at least one reaction unit known for being particularly reactive during said reaction.

Generally, the reactivity probes considered according to the invention are distinguished from one another by the nature of their constituent reaction units. A series of probes, within the meaning of the invention, comprises at least three, in particular at least five, indeed even more, different probes.

Each reactivity probe can comprise up to three reaction units capable of reacting during a catalytic reaction but preferably comprises a single unit.

Figure 1:
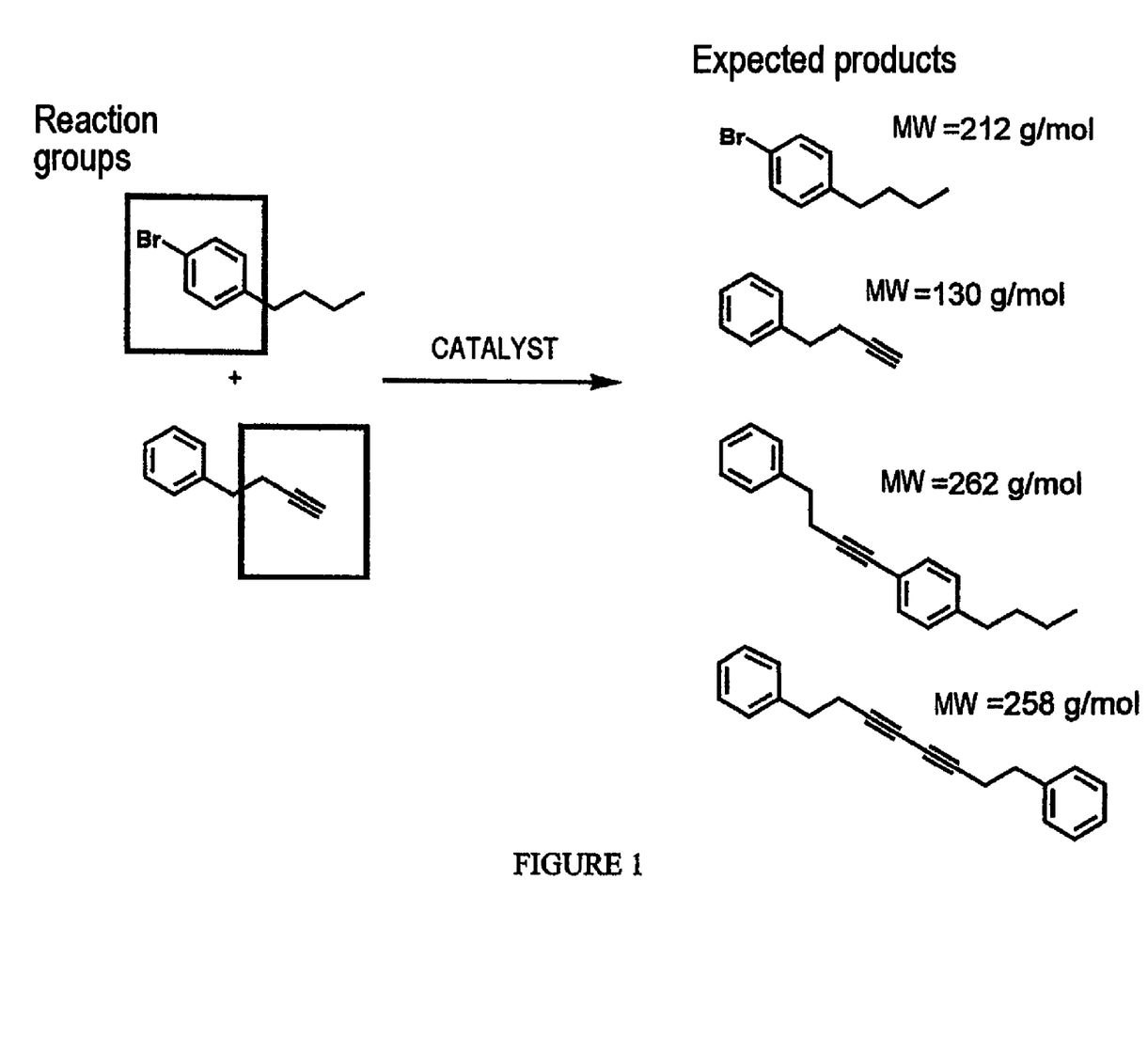
FIG. 1 illustrates the reaction tested in example 1 below and specifies the probes used in the nonlabeled forms and the group of the products possible.

FIG. 1 gives a representation of two types of reactivity probe, one having the bromoarene reaction unit and the other the alkyne reaction unit. This figure also gives a representation of the structures of molecules capable of being obtained from these probes by a catalytic coupling reaction carried out in the presence of palladium.

These reactivity probes can be natural or synthetic. Of course, their synthesis comes within the competence of a person skilled in the art. The probes are compatible with a large number of reactions.

As specified above, the single probe used or at least a portion of the probes used, indeed even all the probes brought into contact, can be respectively modified by a specific or nonspecific labeling system. This labeling system is selected in particular according to the method of detection, that is to say according to the analytical method selected, and is more particularly defined below.

In the case where at least two reactivity probes are brought into contact, the labeling system is selected so as to make possible the rapid characterization of any interaction of at least two reaction units respectively present on each of the reactivity probes.

According to a first alternative form, this distinction can be based on a difference in the molecular weight between the labeled probes, with the proviso, of course, that the analytical method selected is based on detection of the molecular weights. In this case, a labeling system selected can be the same for several reactivity probes of different molecular weights.

Figure 2:
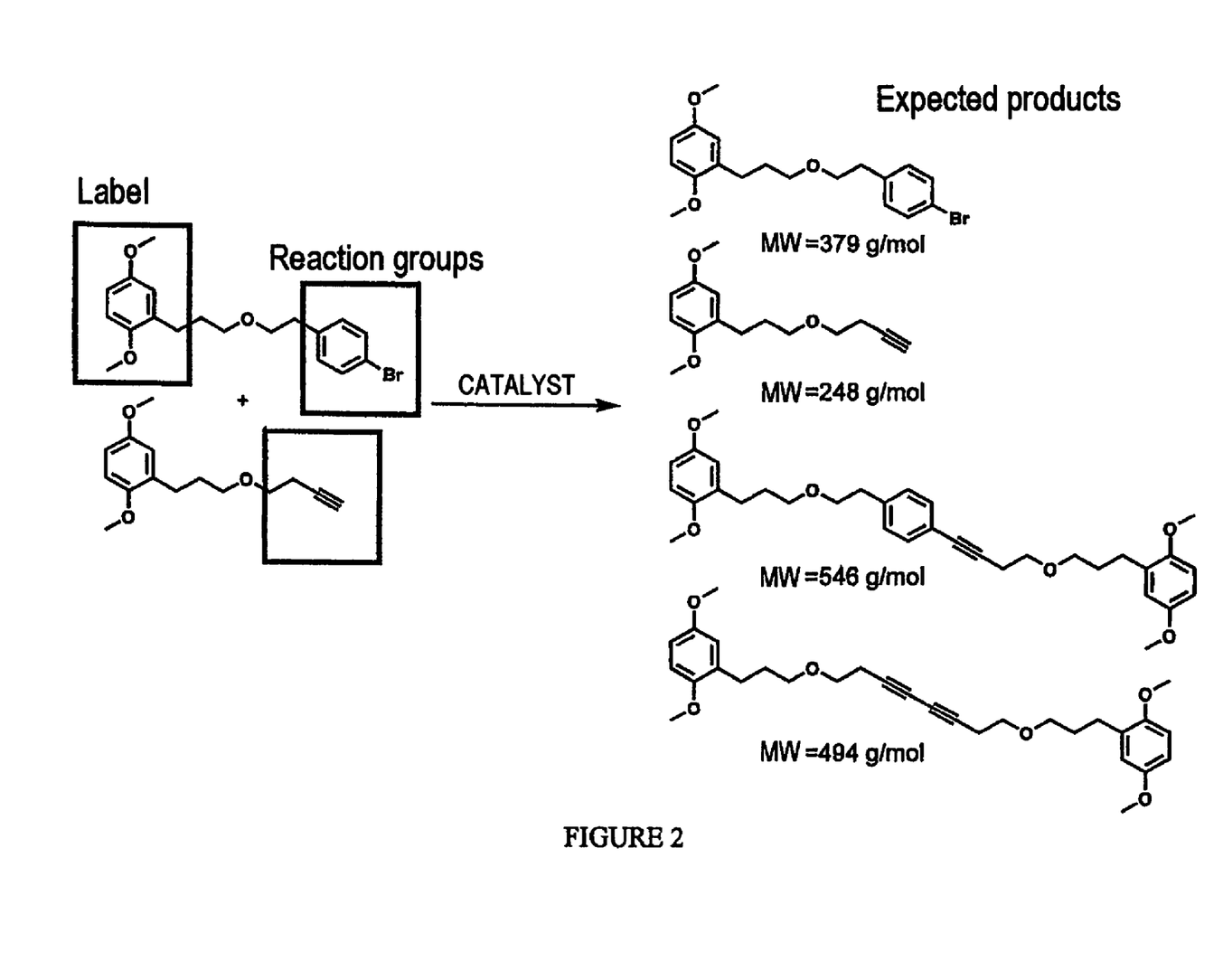
FIG. 2 illustrates the reaction tested in example 1 below and specifies the probes used in the labeled forms and the group of the products possible.

FIG. 2 gives a representation of the two reactivity probes of FIG. 1 associated with the same labeling system. It may be observed that this labeling system makes it possible to distinguish, by their molecular weight, the products capable of being obtained from these probes.

According to a second alternative form, each probe can have a labeling system which is specific to it. In this case, the characterization of a compound having two different labels in its structure makes it possible rapidly to identify the nature of the two probes which have interacted and to characterize thus the type of catalytic reaction involved and/or to assess the degree of reactivity of the catalyst tested.

As regards the analytical method selected, it can be any conventional analytical method, provided that the latter has the ability to distinguish with regard to all or at least the greatest number of compounds capable of being present in the reaction medium on conclusion of the catalytic test.

It can in particular be a detection technique coming under analysis by mass spectrometry, by nuclear magnetic resonance (NMR), by InfraRed, by UltraViolet, by fluorescence, by X-rays or by the electrochemical route or else coming under a coupling of at least two of these analytical methods.

In the context of the present invention, the analytical method more particularly selected involves the use of mass spectrometry.

Mass spectrometry is particularly advantageous insofar as it makes it possible both to detect and to identify the group of the compounds present in the reaction medium on conclusion of the catalytic test. More specifically, it makes possible the characterization of each of the compounds by their mass/charge ratio, coupled or not coupled to another detection technique. Finally, as specified above, it is compatible with the use of the same labeling system on the different probes intended to react, with the proviso that each probe-labeling system combination has a significantly different molecular weight.

Numerous methods based on mass spectrometry for the analysis of effluent are already known. Any type of mass spectrometry which is capable of directly or indirectly analyzing the compounds present in a reaction medium can be used, such as, for example, electrospray mass spectrometry (ESI), atmospheric pressure chemical ionization (APCI) and atmospheric pressure photoionization (APPI).

The APPI technique proves to be particularly advantageous in the context of the present invention due to its chemoselectivity. This technique is based on a method according to which molecular ions are formed directly from a solution by photochemical ionization.

In order to improve the sensitivity of this analytical method, it is advantageous to derivatize the reactivity probes. This derivatization consists in establishing a covalent bond between each probe and a specific ligand, which can also be described as label. This label is chosen, on the one hand, for its inertia during the catalytic test and, on the other hand, its ability to be photoionized very readily during the performance of mass spectrometry.

Advantageously, this type of label has an electron-rich conjugated electronic structure.

More specifically, this structure is such that, when a probe-label complex is subjected to chemical or photochemical ionization, for example during mass spectrometry, it emits a signal having an intensity at least 5 times, indeed even 7 times and in particular 10 times greater than that of the signal emitted by the same probe not associated with said label.

This difference in amplitude should in fact be sufficient to completely eclipse the signals specific to said probe or to any other molecule which is found in the analyzed reaction medium in a form not associated with a label in accordance with the invention.

Very particularly suitable therefore are the labels having one or more aryl units which are highly enriched in electrons, generally due to the nature and the number of their substituents.

Mention may in particular be made, by way of illustration and without implied limitation of this type of compound, of the compounds of $(PhSi)_2$-Ph- and $OP(Ph)_2$-Ph- type.

Very particularly suitable for the invention are the compounds, the labels of general formula (I):

with:

Ar representing a condensed or noncondensed aryl group which can comprise one or more heteroatoms chosen from nitrogen, oxygen and sulfur, it being possible for said group to be substituted by one or more halogen atoms, $C_1$-$C_5$ alkoxy groups and/or phenoxy groups, X representing a $C_1$-$C_{15}$ alkyl chain which can be interrupted by one or more oxygen atoms or ketone functional groups and which can, if appropriate, be substituted, or derivative or analog of this, n representing 1 or 0,

P representing a labile unit, such as, for example, an ester functional group, a benzyl bond or an Si—O bond, which provides for the bonding of said label of general formula (I) to the reactivity probe, and ☐ representing the point of anchoring of the label to the reactivity probe.

Figure 3:
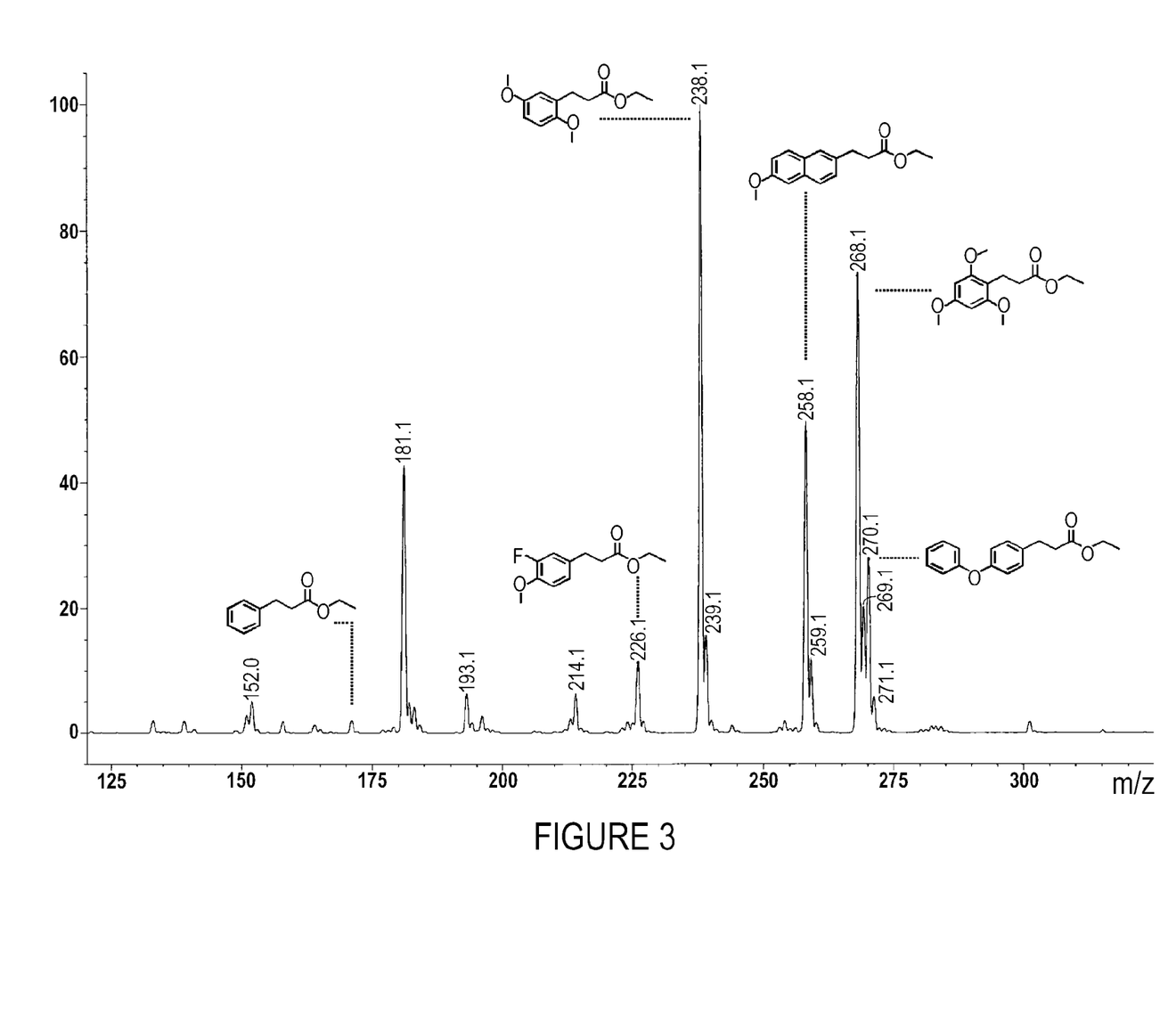
FIG. 3 illustrates the influence of the structure of the labels on their response coefficient in analysis by APPI mass spectrometry.

FIG. 3 describes several ligands of general formula (I).

Each compound of general formula (I) can be characterized by a different sensitivity to the analytical technique selected. In this case, a selection of the most sensitive labeling system can be carried out beforehand. FIG. 3 gives an exact account of this difference in sensitivity and reveals the radical of formula with ☐ representing the point of anchoring to the probe, as particularly advantageous for analysis by mass spectrometry.

In the context of the present invention, each of the probes composing the series selected for carrying out the catalytic test is advantageously derivatized using a label possessing an electron-rich conjugated electronic structure and in particular an identical or different compound of general formula (I).

For obvious reasons, this labeling technique is particularly advantageous when the probe or the molecule which has to be associated with said label has a complex chemical structure capable of resulting in the display of a plurality of signals and which is furthermore of variable intensity when it is subjected to an ionization technique. In contrast to the probe alone or the molecule alone, the probe-label complex emits only a single signal of high intensity which will be specific to it. This results in a considerable simplification in the analysis of a reaction medium on conclusion of a given reaction. This simplification in reading is illustrated in particular in example 2 below.

In addition, this labeling technique is particularly reliable in monitoring the conversion of a probe or molecule corresponding to the substrate to give a separate product. As is shown in example 2, there exists a linearity in response between the decrease in the ionization signal emitted by the label-starting substrate complex and the increase in the ionization signal emitted by the label-product formed complex.

Finally, on conclusion of the catalytic test, the reaction medium can comprise compounds resulting from an interaction between two reaction units referred to as further coupling of dimer type, that is to say functionalized by two separate labels, of trimer coupling type, that is to say functionalized by three separate labels, and the like. By simple reading of the analytical data acquired by mass spectrometry, it is possible, first, to rapidly distinguish the data relating to single compounds, corresponding in particular to the starting reactivity probes, from the data relating to "dimer", "trimer" and the like compounds, and thus rapidly to describe the types of compounds obtained during the catalytic test. In addition, it is also possible, in each of the data categories obtained as specified above, to characterize the nature of the probes which have interacted.

The labels considered according to the invention are preferably bonded to the reactivity probe or to a given molecule via a labile bond, so as to make possible, if desired, easy recovery of the associated probe or molecule. This labile bond should, however, advantageously be retained during the ionization, in particular mass spectrometry ionization. If necessary, it may be advantageous to carry out the ionization of the probe-label system in the presence of a dopant.

The use of these dopants comes under a practice which is common in ionization techniques, in particular mass spectrometry ionization techniques.

The use of the labels according to the invention also proves to be advantageous in the purification of the associated probes or molecules. This is because, due to their high electron density, the labels considered according to the invention naturally display a high affinity for the supports of stationary phase types, for example, having an electron deficiency. The attachment by affinity of the labels to such supports makes possible their ready separation of the corresponding probe-label complexes from the reaction medium and the resulting recovery of the associated probe or molecule.

However, it is possible to envisage using, in the methods according to the invention, other types of labeling based on specific label/ligand interactions, such as antibody/antigen and fluorescent agent/fluorescence quencher pairs. Thus, many systems used in the field of biology, in particular in immunoassaying techniques, can, if appropriate, be used in the context of the present invention. However, this choice of labels involves having available a label/ligand pair specific to each reactivity probe and, furthermore, requires more difficult logistics in terms of analysis for a sensitivity which may be lower.

According to a specific alternative form of the invention, a device for detection by mass spectrometry is coupled upstream to a chromatography device. This device, in particular an affinity or exclusion liquid chromatography device, has available at least one chromatography column in which is made to move, on either side, if appropriate in the form diluted with an eluent, the reaction medium which has been subjected to the catalytic test and for which it is desired to characterize the composition.

On conclusion of each analysis, the data obtained for each of the catalytic tests are archived and compared with those obtained with the other catalysts tested. This comparison can be carried out by simple reading of the group of the results. However, for reasons of speed and of reliability, comparative reading using a computer tool is favored. This comparative analysis is targeted at identifying the data more particularly specific to a reduced number of catalytic tests, indeed even to a single catalytic test. A datum is said to be specific when it is obtained only for a reduced number of catalytic reactions, indeed even a single reaction, or else when it is obtained with a very different selectivity from those observed for the other catalytic tests. This selectivity can be reflected by an overexpression of the compound which is associated with it or, conversely, an underexpression of the latter.

This characterization can be carried out in particular by superimposition of the data of the group of the catalytic tests, with an indexing method suitable for distinguishing the data having the lowest occurrence or, conversely, the highest occurrence. As each datum characterizes a single compound, it is subsequently possible to isolate and identify the associated compound, in particular using standard analytical methods.

Catalysts

The catalysts considered according to the invention can be of organic or inorganic chemical nature, in particular of organometallic nature, or else of biological nature, such as proteins, cells or enzymes.

They can be all the catalysts which can be used in homogeneous or heterogeneous catalytic synthesis.

The catalysts for chemical conversion comprise the majority of the elements of the Periodic Table and are solids, generally, under the standard reaction conditions.

These catalysts can be tested in isolation or in the form of combinations.

These catalysts can also be in a supported form. The type of support can be chosen from inert clays, from zeolites, from ceramics, from carbon or from an inert organic material. They can also be metal oxides, such as $Al_2O_3$. These supports can be employed in various solid forms, such as, for example, honeycombs, particles or networks.

Mention may in particular be made, by way of illustration and without implied limitation of these catalysts, of catalysts based on bismuth, tin, nickel, rhodium, palladium, ruthenium, titanium, zirconium, iridium, copper, cobalt, rhodium, zinc, platinum and rare earth metals.

A library of catalysts generally comprises several hundred catalysts.

This library of catalysts can advantageously be recorded on a data medium.

Reaction Conditions

The basic reaction conditions are generally those conventionally used for a chemical or biological reaction under consideration. They generally require the choice of a solvent medium, of its degree of dilution, of the coreactants, of a temperature, of a pressure and/or of the pH of the reaction medium.

Within the meaning of the present invention, the term "coreactant" denotes any compound which, by its presence in the reaction medium, is capable of participating in the reaction, such as carbon monoxide, for example, of affecting the yield and/or the selectivity of the reaction. It can in particular be an acidic, basic, nucleophilic or electrophilic compound, a dipole or a metal-chelating agent.

It will be possible to acquire a better understanding of the invention on reading the example which follows and the appended figures.

FIGURES

FIG. 7 illustrates the linearity in response of the probes used in example 2, and FIGS. 8A and 8B compare the spectra obtained by mass spectrometry by ionization of a nonlabeled complex molecule (FIG. 8A) and of the same complex molecule labeled according to the invention (FIG. 8B).

EXAMPLE 1

The method according to the invention was carried out in order to select, between the catalysts $Pd(OAc)_2Cl_2$ and $Pd(PPh_3)_2Cl_2$, the most active catalyst in producing condensation of the two reactivity probes represented in FIG. 1. The protocol followed in carrying out this condensation reaction is as follows:

Triethylamine (2.3 mmol) is added to a mixture of CuI (0.0075 mmol) and of $Pd(PPh_3)_2Cl_2$ or $Pd(OAc)_2$ (0.015 mmol) in acetonitrile (4 ml). The two reactivity probes, namely the bromoarene and the alkyne, are subsequently added dropwise at ambient temperature in a proportion of 0.77 mmol each. The reaction mixture is degassed several times with argon and then brought to reflux.

After reacting for 12 hours, 10 microliters of the medium are diluted in methanol (35 ml) and analyzed without purification by mass spectrometry using an MSD spectrogram from Agilent equipped with an APPI source and with a single quadripole detector.

Figure 4:
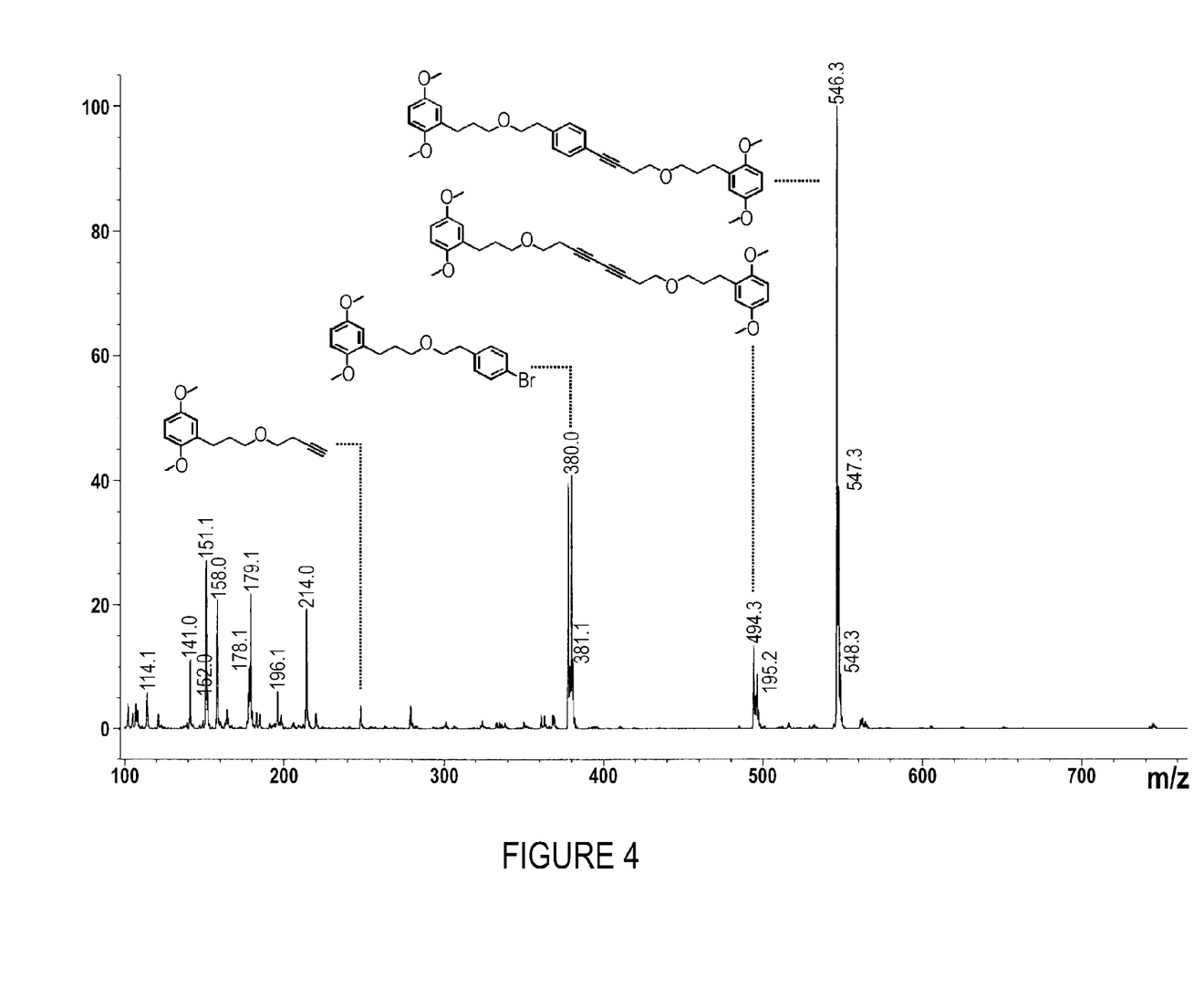
FIG. 4 shows a direct analysis of the crude reaction product obtained with the catalyst $Pd(PPh_3)_2Cl_2$.

FIG. 4 reports the analysis of the crude reaction product obtained with the catalyst $Pd(PPh_3)_2Cl_2$. The presence is recorded of two coupling products in a ratio of 85/15, including the expected product in higher proportion. It is also observed that the substrate involved in the formation of two products has been consumed and that a residue remains from the substrate involved only in the formation of one product.

Figure 5:
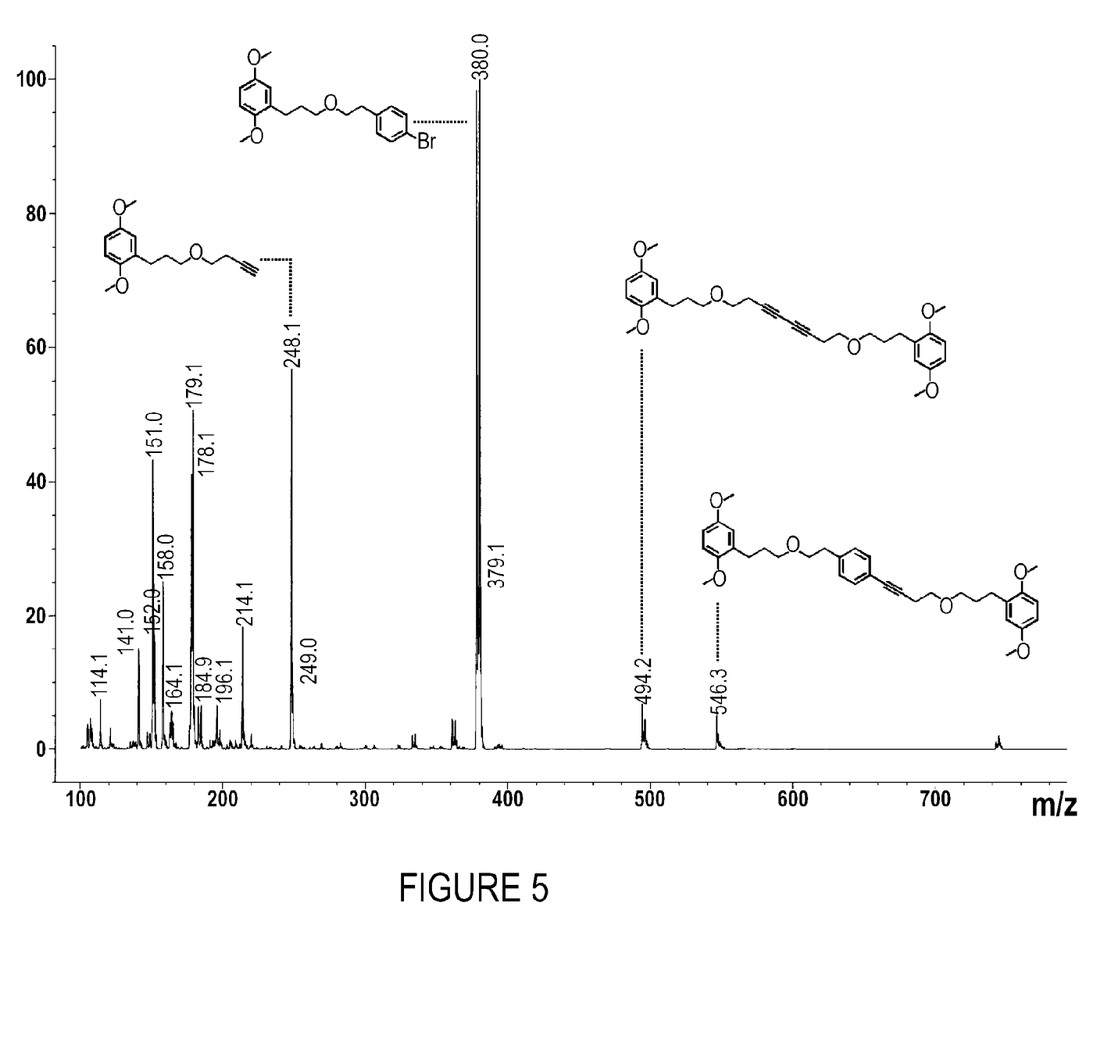
FIG. 5 shows the analysis of the crude reaction product obtained with the catalyst $Pd(OAc)_2$.

In contrast, FIG. 5, which relates to the analysis of the crude reaction product obtained with the catalyst $Pd(OAc)_2$, shows that this second catalyst results only in the formation of very small amounts of products.

Figure 6:
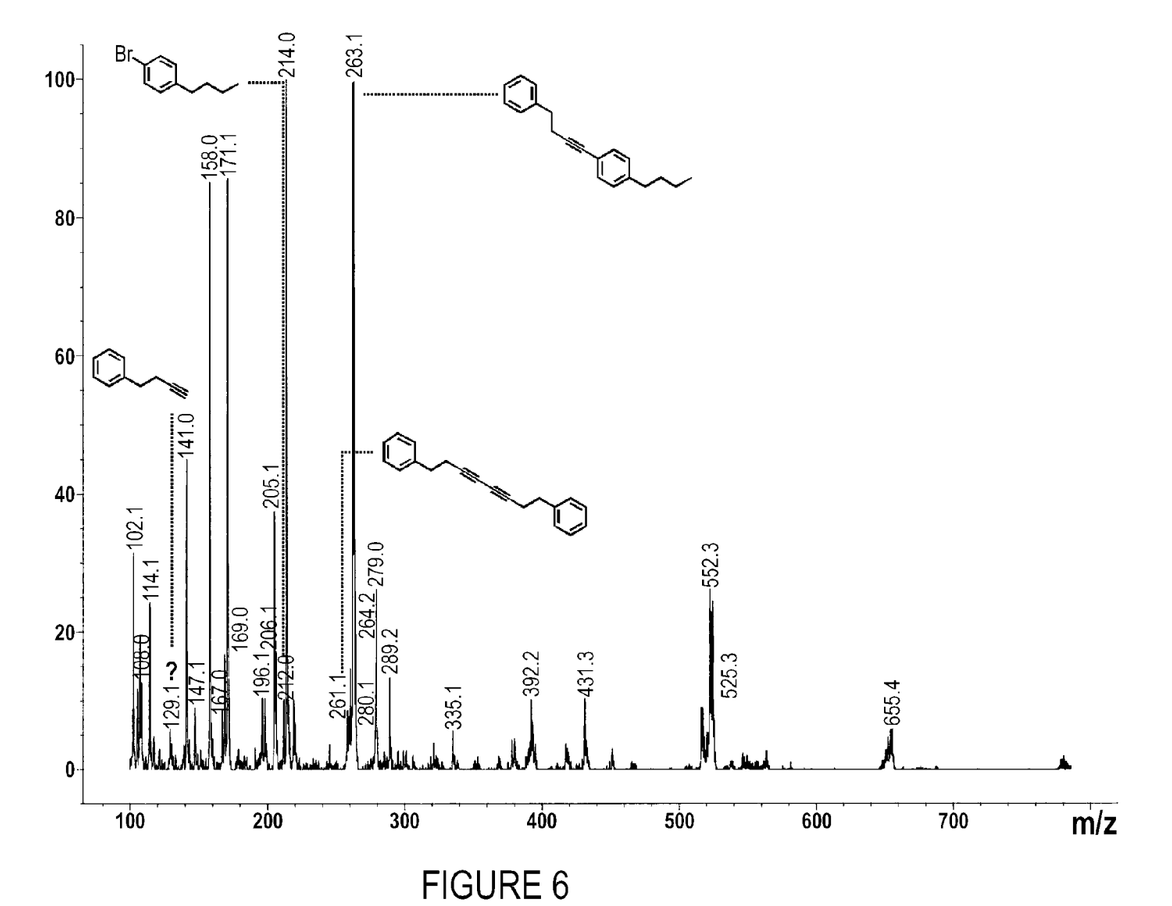
FIG. 6 is a control figure for the analysis of nonlabeled crude product.

Finally, FIG. 6, which relates to the analysis of the reaction medium obtained with the catalyst $Pd(PPh_3)_2C_2$ brought into contact with the two probes not provided with the labeling system, reveals that the analytical spectrum is denser and that its deciphering is consequently more difficult.

The results correlate with those obtained by conventional analysis (HPLC). They demonstrate the speed of production and the accuracy of the results obtained by the method according to the invention for the rapid analysis of libraries of crude reaction products and detection of the compounds formed by combination of reactive groups.

EXAMPLE 2

The reactivity of the catalyst $Pd(PPh)_3$ for the Sonogashira coupling was tested in the presence of several types of cocatalysts, the chemical nature of which is specified in the table below.

The reaction tested can be represented diagrammatically as follows.

Each reaction was carried out using the following conditions.
Catalyst: Pd(PPh)$_3$Cl$_2$/4 mol %: 2.1 mg CuI or other: 10 mol %: 1.5 mg
ArI: TMB-C$_8$—O—Ar—I/1 eq./0.075 mmol/37.35 mg
Alkyne: heptyne/1.2 eq./0.09 mmol/8.65 mg/11.8 μl
Base: Et$_3$N/2 eq./0.15 mmol/21 μl
Solvent: THF 1.5 ml+H$_2$O 300 μl
Temperature: 50° C.
Time: 15 h Each reaction medium is analyzed on conclusion of the catalytic test by mass spectrometry according to the following protocol:

Each reaction medium is filtered through a celite cartridge and then the volume of each sample is brought to 2.5 ml by addition of methanol so as to adjust the total concentration of labeled molecule to approximately 3×10$^{-2}$ M.

A volume of 17 μl of each sample is withdrawn and then diluted using a methanol/toluene mixture so as to obtain approximately 5×10$^{-4}$ M solutions.

These solutions are then analyzed individually using an Agilent 1100 Series LC/MSD mass spectrometer coupled to a columnless HPLC line.

The volume injected is 1 μl and the mobile phase flow rate is set at 0.5 ml/min. The nitrogen flow rate in the APPI source is 5 ml/min, while the nebulization pressure in the source is brought to 30 psig and the temperature of the vaporizer to 275° C.

Each sample is analyzed in a time of less than 30 seconds per sample.

The results are presented in table I below:

TABLE I

| Cocatalyst | Yield of coupling product |
| --- | --- |
| FeS | 0 |
| NiCl$_2$ | 0 |
| InI | 0 |
| AgCO$_3$ | 15 |
| Cu$_2$O | 91 |
| None | 1 |
| FeSO$_4$•7H$_2$O | 0 |
| CdCl$_2$ | 3 |
| GdI$_2$ | 0 |
| AgNO$_2$ | 12 |
| CuCN | 100% conversion, including 22% of reaction with CN |
| CuI | 95 |
| Fe/graphite | 0 |
| RuCl$_3$ | 0 |
| BiI$_3$ | 0 |
| Ag$_2$O | 17 |
| Cu powder | 5 |
| CuBr/Me$_2$S | 89 |
| MnO$_2$ | 0 |
| SbCl$_3$ | 0 |
| CoCl$_2$ | 0 |
| Ag colloidal | 0 |
| Cu/Zn | 10 |
| CuCl | 86 |
| lanthanide chloride | 0 |
| Cs(Ac$_2$O) | 0 |
| Al(iPrO)$_3$ | 0 |
| CeSO$_4$•4H$_2$O | 0 |
| CeF$_3$ | 0 |
| ZrCl$_4$ | 0 |
| Ti(IPrO)$_4$ | 0 |
| Ga$^{III}$ acetylacetonate | 0 |
| Er$_2$O$_3$ | 0 |
| CeCl$_3$ | 0 |
| BaCl$_2$•2H$_2$O | 0 |
| Pd black | 3 |
| LiBF$_4$ | 0 |

TABLE I-continued

| Cocatalyst | Yield of coupling product |
| --- | --- |
| CrCl$_3$ | 0 |
| SnCl$_2$ | 5 |
| Vit C | 0 |
| I$_2$ | 0 |
| ThNO$_3$•3H$_2$O | 5 |
| AuClPPh$_3$ | 15 |
| AuCl$_4$•HCl | 11 |
| ZrCl$_2$O•8H$_2$O | 0 |
| Au$^{III}$O | 25 |
| SnO | 0 |
| Ag$_2$O | 19 |
| CdI | 0 |
| AgCl | 16 |

Figure 7:
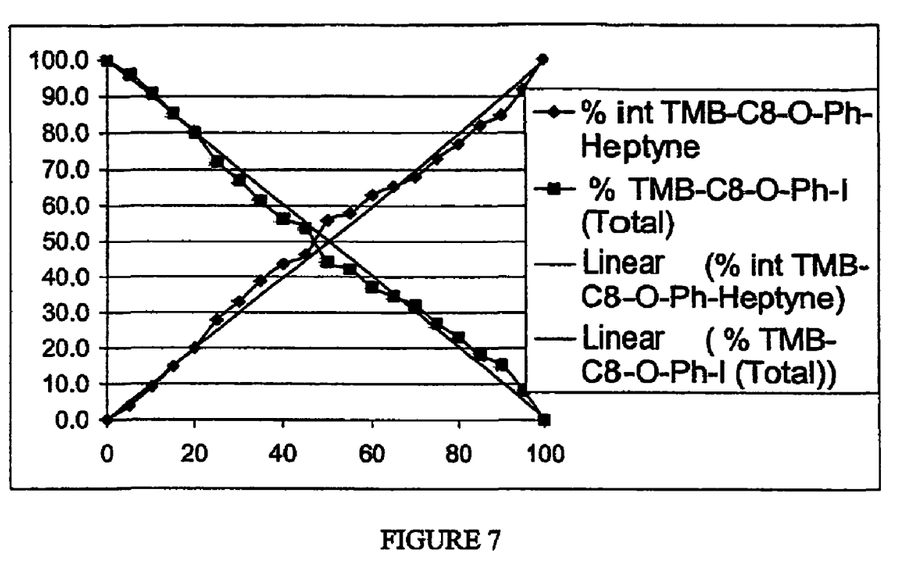
Figure 8A:
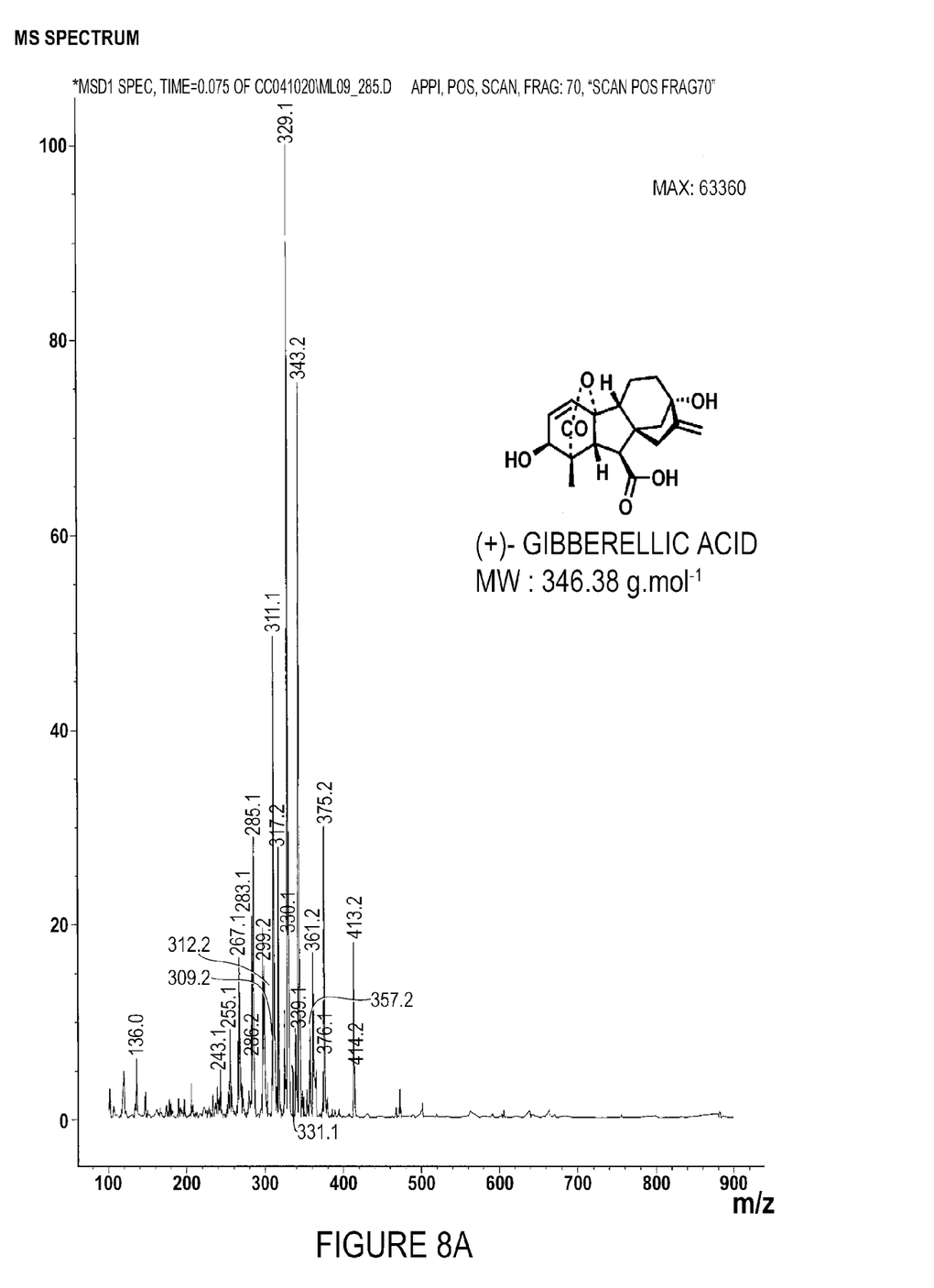
Figure 8B:
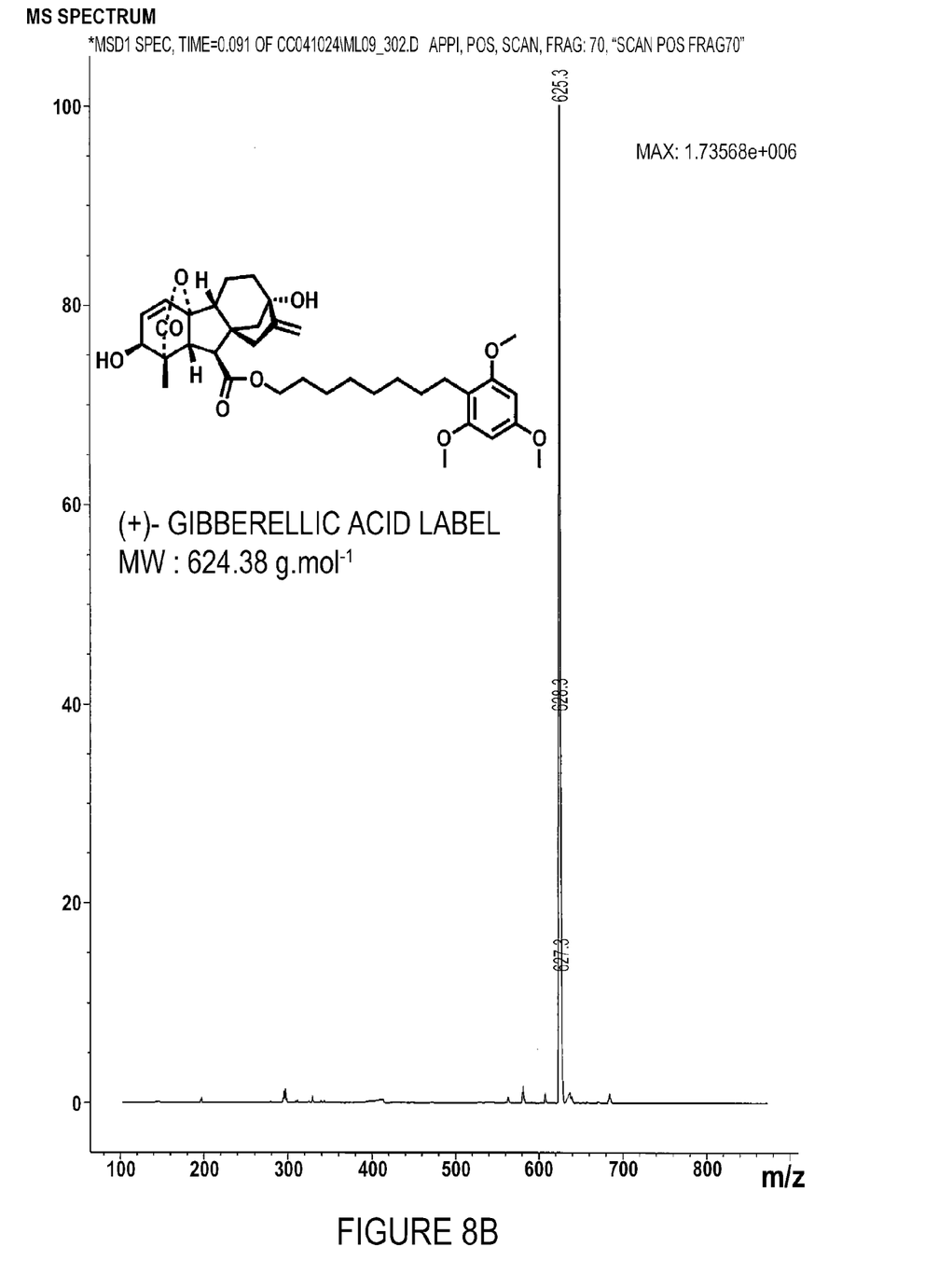

FIG. 7 illustrates more particularly the monitoring of the reaction carried out in the presence of ammonia instead of triethylamine and using Cu$_2$O as cocatalyst.

The presence of the label on the probe constituting the substrate produces a linear response, the intensity of which varies as a function of the stoichiometric ratio of the substrate to the product formed.

What is claimed is:

1. A method for selecting at least one catalyst from a library of catalysts for its reactivity with regard to a chemical conversion, comprising:
    a) testing the catalytic activity of a first catalyst belonging to said library of catalysts with regard to a reaction medium comprising, as compound to be converted, at least one reactivity probe having a specific or nonspecific labeling system and comprising at least one reaction unit capable of reacting according to said chemical conversion, said labeling system being a compound of general formula (I):

Ar—X—(P)$_n$-☐     (I), with:
    Ar representing a condensed or noncondensed aryl group which can comprise one or more heteroatoms chosen from nitrogen, oxygen and sulfur, it being possible for said group to be substituted by one or more halogen atoms, C$_1$-C$_5$ alkoxy groups and/or phenoxy groups,
    X representing a C$_1$-C$_{15}$ alkyl chain which can be interrupted by one or more oxygen atoms or ketone functional groups and which can, if appropriate, be substituted, or derivative or analog of this,
    n representing 1 or 0,
    P representing a labile unit, which provides for the bonding of said label of general formula (I) to the reactivity probe, and
    ☐ representing the point of anchoring of the label to the reactivity probe,
    b) analyzing, on conclusion of said catalytic test, said reaction medium so as to qualitatively and/or quantitatively characterize the compounds formed,
    c) repeating stages a) and b) for at least one other catalyst of said library,
    d) comparing the analytical results obtained for each catalyst so as to characterize at least one catalyst having the required reactivity with regard to said chemical conversion.

2. The method as claimed in claim 1, wherein the reaction medium comprises at least two types of reactivity probe, each type of probe comprising at least one reaction unit capable of reacting with at least one unit present on the other type of probe according to said chemical conversion.

3. The method as claimed in claim 2, wherein each probe has a labeling system.

4. The method as claimed in claim 3, wherein each probe has a specific labeling system.

5. The method as claimed in claim 1, wherein each probe has a single reaction unit.

6. The method as claimed in claim 1, wherein a reaction unit is composed of a saturated bond of a carbon atom with at least one halogen atom and/or one heteroatom or an unsaturated bond between two carbon atoms, between a carbon atom and at least one heteroatom or between two identical or different heteroatoms.

7. The method as claimed in claim 1, wherein the reaction unit is chosen from:

with X representing a halogen atom.

8. The method as claimed in claim 1, wherein the label has an electronic structure such that the probe-label system emits, when it is subjected to chemical or photochemical ionization, a signal with an intensity at least 5 times greater than that emitted by the same probe not associated with said label.

9. The method as claimed in claim 1, wherein the probe-labeling system combinations brought into contact are distinguished by their molecular weight.

10. The method as claimed in claim 9, wherein the probe-labeling system combinations carry the same labeling system.

11. The method as claimed in claim 1, wherein the analysis in stage b) is carried out by mass spectrometry.

12. The method as claimed in claim 11, wherein it involves the APPI technique.

13. The method as claimed in claim 11, wherein the mass spectrometer is coupled to a chromatography device.

14. A computer system of use in the implementation of a method as claimed in claim 1, wherein it comprises at least one computer server arranged for:
   a) archiving, for each catalyst tested according to said method, the group of the data acquired during the analysis of the corresponding reaction medium,
   b) comparing the data archived for the group of the catalysts tested for the purpose of characterizing specific catalytic reactivities, and
   c) archiving the specific reactivities detected according to stage b).

15. The method as claimed in claim 1, wherein P represents a labile unit selected from the group consisting of an ester functional group, a benzyl bond, and an Si—O bond.

16. A method for characterizing at least one catalytic application of a catalyst, comprising:
   a) testing the catalytic activity of a first catalyst with regard to a reaction medium comprising, as compounds to be converted, a series of reactivity probes, each probe being different from one another and comprising at least one reaction unit capable of reacting with at least one other unit present on a separate or nonseparate probe, each probe having a labeling system being a compound of general formula (I):

(I), with:
   Ar representing a condensed or noncondensed aryl group which can comprise one or more heteroatoms chosen from nitrogen, oxygen and sulfur, it being possible for said group to be substituted by one or more halogen atoms, $C_1$-$C_5$ alkoxy groups and/or phenoxy groups,
   X representing a $C_1$-$C_{15}$ alkyl chain which can be interrupted by one or more oxygen atoms or ketone functional groups and which can, if appropriate, be substituted, or derivative or analog of this,
   n representing 1 or 0,
   P representing a labile unit, such as, for example, an ester functional group, a benzyl bond or an Si—O bond, which provides for the bonding of said label of general formula (I) to the reactivity probe, and
   ☐ representing the point of anchoring of the label to the reactivity probe,
   b) analyzing, on conclusion of said catalytic test, said reaction medium so as to qualitatively and/or quantitatively characterize the compounds formed,
   c) repeating stages a) and b) for at least one other catalyst,
   d) comparing the analytical results obtained for each catalyst so as to distinguish, from the common data, the data specific to each analysis carried out according to stage b),
   e) characterizing the compound or compounds corresponding to these specific data, and qualifying and/or quantifying the catalytic reactivity of the corresponding catalyst or catalysts.

17. The method as claimed in claim 16, wherein P represents a labile unit selected from the group consisting of an ester functional group, a benzyl bond, and an Si—O bond.

* * * * *